United States Patent [19]  [11] 4,439,503
Doddapaneni  [45] Mar. 27, 1984

[54] METAL-ORGANIC LIQUID DEPOLARIZER ELECTROCHEMICAL CELL
[75] Inventor: Narayan Doddapaneni, Glenside, Pa.
[73] Assignee: Honeywell Inc., Minneapolis, Minn.
[21] Appl. No.: 506,463
[22] Filed: Jun. 21, 1983
[51] Int. Cl.³ .............................................. H01M 6/14
[52] U.S. Cl. .................................... 429/108; 429/194; 429/213
[58] Field of Search ............... 429/108, 212, 213, 194, 429/218, 101, 105

[56] References Cited
U.S. PATENT DOCUMENTS
3,686,038  8/1972  Garth .................................... 429/197

*Primary Examiner*—Anthony Skapars
*Attorney, Agent, or Firm*—Charles G. Mersereau

[57] ABSTRACT

An organic cathode depolarizer for a non-aqueous electrochemical cell system having an active metal anode, a cathode and a non-aqueous electrolyte is disclosed which is represented by the formula

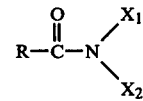

where R is a group selected from those consisting of alkyl, alkoxy, phenyl or phenoxy groups and where $X_1$ and $X_2$ are halogens.

8 Claims, No Drawings

METAL-ORGANIC LIQUID DEPOLARIZER ELECTROCHEMICAL CELL

BACKGROUND OF THE INVENTION

1. Field of the Invention

The invention relates to the field of non-aqueous electrochemical cells and, more particularly, to a high-rate, non-aqueous electrochemical cell which is free of sulfur-containing compounds.

2. Description of the Prior Art

Much work has been done in the field of high energy battery systems utilizing highly reactive anode materials such as alkali metals in combination with non-aqueous electrolytes. The electrolyte is normally composed of a solute which is commonly a metal salt or a complex metal salt of group I-A, II-A or III-A elements of the Periodic Table dissolved in a compatible non-aqueous solvent. The batteries often are used in applications which require them to be operable over awide temperature range with a high output over that wide temperature range. For this reason, much research has been conducted concerning the development of solvent-solute pairs which are stable and have a high ionic conductivity over a wide temperature range. This generally means that the solvent solute pair should be in the liquid state over this wide temperature range, i.e., have a low freezing point and a high boiling point.

In addition, it is desirable that the chemical system of the electrochemical cell have a long, stable shelf life when used in a primary or secondary battery system. The prior art is replete with many examples of such cells which utilize solvents containing sulfur dioxide ($SO_2$), thionyl chloride ($SOCl_2$) and sulfuryl chloride ($SO_2Cl_2$). These compounds, along with certain other oxyhalides, are normally used in combination with an alkali metal anode or alkaline earth metal anode and an electrolyte consisting of a salt of a cation of the metal of the anode together with the solvent materials.

The basic problem with the electrochemical cells of the prior art, especially those cells utilizing sulfur dioxide, thionyl chloride or sulfuryl chloride has been the problem with safe storage and operation of the batteries. Under certain circumstances, the batteries tend to experience thermal runaway in which reactions and pressure buildup within the cell may actually cause a very violent explosion. One reason for this occurrence has been traced to reactions which occur between the metal anode and the sulfur of the solvent material. In addition, because sulfur dioxide is a gas at ordinary temperatures, overheating or the use of such batteries at higher temperatures of batteries may lead to the buildup of excessive pressure within the cell.

SUMMARY OF THE INVENTION

In accordance with the present invention, the problems associated with the use of sulfur dioxide, thionyl chloride and sulfural chloride in high energy density, non-aqueous electrochemical cells have been solved. This is done by the provision of an organic solvent depolarizer system which allows long-term safe storage and greatly reduces the hazards previously encountered in operating such cells including the toxicity problems associated with the electrochemical system involved.

The organic solvent depolarizers of the invention may be represented by the general formula:

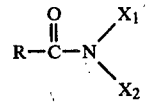

wherein R is an alkyl, alkoxy, phenyl or phenoxy group and $X_1$ or $X_2$ are halogens. Depending on the cell application, the depolarizers may be in the liquid or solid state. The cell also includes an alkali or alkaline earth metal anode, a cathode where the cathode depolarizer is reduced, and a compatible electrolyte salt which is soluble in the solvent depolarizer.

DESCRIPTION OF THE PREFERRED EMBODIMENT

The invention is based on the desirability of eliminating sulfur containing compounds from high voltage, high energy density, non-aqueous electrochemical cells without sacrificing cell performance. Accordingly, it has been discovered that certain N,N-dihalocarbamates provide excellent cathode depolarization characteristics, are compatible with the highly reactive alkali or alkaline earth metal anodes and non-aqueous electrolyte salts. N,N-dihalocarbamates of the general formula

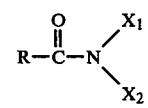

wherein R is an alkyl, alkoxy, phenyl or phenoxy group and $X_1$ and $X_2$ are halogens including flourine, chlorine, bromine, and iodine or combinations of them.

While others may successfully be used, the preferred organic depolarizer is one selected from a group including N,N-dichloromethoxy carbamate and N,N-dichloroethoxy carbamate.

The solvent depolarizer is paired with a compatible electrolyte salt which forms a system capable of long shelf life and good cell performance. The electrolyte salt must be soluble in the solvent depolarizer. Any electrolyte salt which meets the cell criteria may be used.

Anode materials are generally selected from the alkali or alkaline earth metals. Of these, lithium, sodium, calcium and potassium are preferred.

One successful cell utilized a lithium anode, N,N-dichloroethyl carbamate as the cathode depolarizer and a tetra-alkyl ammonium perchlorate electrolyte salt. The cell was observed to have an open circuit voltage of 3.94 volts and, at a constant discharge current of 0.32 m A per square centimeter, the cell exhibited a flat discharge voltage of 3.52 volts.

Another cell had a lithium anode, an N,N-dichloroethyl carbamate solvent depolarizer and a lithium hexafluoroarsenate electrolyte salt. That cell exhibited a flat discharge voltage of approximately 3.5 volts at a constant current of 1 m A per square centimeter. The solubility of the electrolyte salt in the solvent depolarizer was observed to be 1.3 g in 5 g of solvent at room temperature.

I claim:

1. In a non-aqueous electrochemical cell system having an active metal anode, a cathode and a non-aqueous electrolyte, the improvement comprising an organic cathode depolarizer represented by the formula

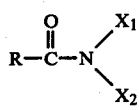

where R is a group selected from those consisting of alkyl, alkoxy, phenyl or phenoxy groups and where $X_1$ and $X_2$ are halogens.

2. The system of claim 1 wherein said organic cathode depolarizer is a liquid at the normal operating temperature of said system.

3. The system of claim 1 wherein said organic cathode depolarizer is a solid at the normal operating temperature of said system.

4. The system of claim 1 wherein the halogens of $X_1$ and $X_2$ are selected from the group consisting of flourine, chlorine, bromine and iodine or combinations thereof.

5. The system of claim 3 wherein said halogens are chlorine.

6. The system of claim 1 wherein said anode is one selected from the alkali and alkaline earth metal groups consisting of lithium, sodium, calcium and potassium.

7. The system of claim 5 wherein said organic depolarizer is one selected from the group consisting of N,N-dichlorethyl carbamate, N,N-dichloromethyl carbamate, N,N-dichloromethoxy carbamate and N,N-dichloroethoxy carbamate.

8. The system of claim 6 wherein said organic depolarizer is one selected from the group consisting of N,N-dichloroethyl carbamate, N,N-dichloromethyl carbamate, N,N-dichloromethoxy carbamate and N,N-dichloroethoxy carbamate.

* * * * *